United States Patent
Yonemitsu et al.

[15] 3,691,232
[45] Sept. 12, 1972

[54] PROCESS FOR PRODUCING OXALIC ACID

[72] Inventors: Eiichi Yonemitsu, Kashiwa-shi; Tomiya Isshika, Tokyo; Tsuyoshi Suzuki, Matsudo-shi; Akihiko Sanada, Tokyo, all of Japan

[73] Assignee: Mitsubishi Edogawa Kagaku Kabushiki Kaisha, Tokyo, Japan

[22] Filed: Aug. 4, 1969

[21] Appl. No.: 847,222

[30] Foreign Application Priority Data

Aug. 7, 1968  Japan........................43/55526

[52] U.S. Cl. .............................................260/531 R
[51] Int. Cl................................................C07c 51/32
[58] Field of Search....................................260/531 R

[56] References Cited

UNITED STATES PATENTS

| | | |
|---|---|---|
| 3,531,520 | 9/1970 | Obmornov et al.....260/531 R |
| 3,081,345 | 3/1963 | Carlson et al..........260/533 R |
| 2,867,657 | 1/1969 | Selwitz...............260/531 R X |
| 1,509,575 | 9/1924 | Young...................260/531 R |

*Primary Examiner*—Lorraine A. Weinberger
*Assistant Examiner*—Richard D. Kelly
*Attorney*—Sughrue, Rothwell, Mion, Zinn & Macpeak

[57] ABSTRACT

Oxalic acid is produced at high yield by the oxidation of ethylene glycol with an acid mixture comprising 2–60 wt percent nitric acid 20–78 wt percent sulfuric acid and 20–50 wt percent water. The molar ratio of nitric acid/ethylene glycol should not be less than 3/1.

2 Claims, 1 Drawing Figure

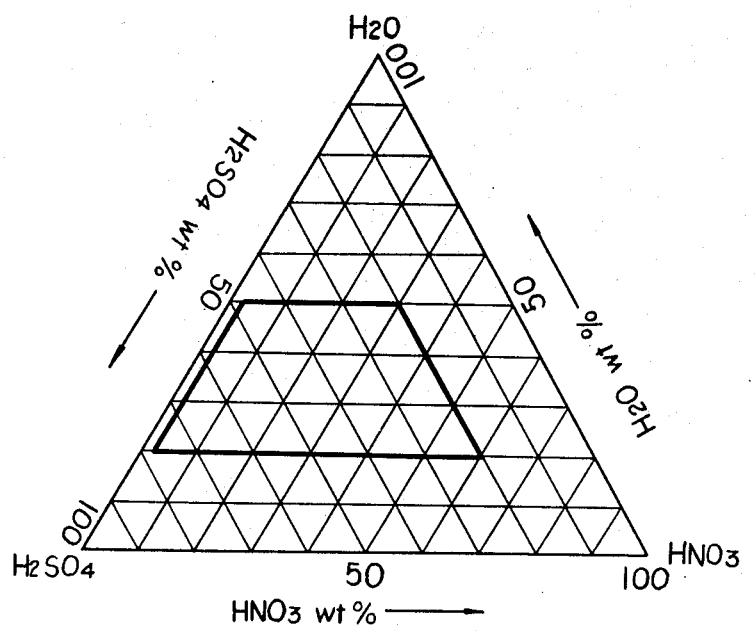

PROCESS FOR PRODUCING OXALIC ACID

DETAILED DESCRIPTION OF THE INVENTION

This invention relates to a process for producing oxalic acid, particularly to a process for oxidizing ethylene glycol to oxalic acid.

Oxalic acid has been produced, as is well known, through the calcination of sodium formate or the oxidation of saccharide with nitric acid. However, the formate process is complicated, because the process comprises many production stages. Also the process of oxidizing saccharide has such disadvantages as; price of saccharide as raw material is unstable, the yield of oxalic acid based on the carbon in the raw material is a low as 60–70 percent, nitric acid is substantially lost during the reaction and the purity of the product is low. Other processes such as oxidation of acetylene, ethylene or propylene with nitric acid, oxidation of organic substances in the presence of an alkali, and oxidation of organic substances with potassium permanganate under mild conditions, have also been proposed. But these processes cannot produce oxalic acid at high yields, and there are various technical difficulties involved in the practice of these processes.

In order to solve difficulties in nitric acid oxidation processes, we have checked the selection of raw materials, reaction conditions and reaction procedures. The formation of oxalic acid and subsequent economics of the production were found to be largely depending upon the above factors, and the search for an optimum condition lead to the present invention.

We have found that oxalic acid can be produced at high yield by the oxidation of ethylene glycol with an acid mixture consisting of nitric acid and sulfuric acid within a certain concentration range, when the molar ratio of nitric acid to ethylene glycol is 3/1 or more.

In the present invention, the concentrations and the ratios to ethylene glycol of nitric acid and sulfuric acid have a great influence on the reaction rate, yield of oxalic acid, ratio of the formation of nitrogen monoxide versus nitrogen peroxide as well as on economics of the process. Suitable concentration range is indicated in the attached drawing. The preferable concentration range comprises 2 to 60 wt percent nitric acid, 20 to 78 wt percent sulfuric acid and 20 to 50 wt percent water. The molar ratio of nitric acid/ethylene glycol should not be less than 3/1. If ethylene glycol exceeds this ratio, nitric acid become insufficient and a reductive environment is formed.

Reaction temperatures influence not only the reaction rate but also the selectivity for the formation of the desired product. The reaction may be carried out at a temperature ranging from room temperature to 100° C., but preferable range of the reaction temperature is from 60° to 100°C.

An advantage of the present invention is that the oxalic acid obtained is not contaminated with heavy metals, since heavy metal catalyst such as vanadium pentoxide described in the specification of British Pat. No. 1,095,100 is not required in the process.

Further advantages of the present invention are that neither side-reactions nor self-decomposition, which usually occur if a heavy metal catalyst is employed, take place and oxalic acid is obtained substantially quantitatively.

Also, in the process of this invention, characteristically, the gases such as nitrogen or nitrogen monoxide which are not convertible to nitric acid, are scarcely formed. Such gaseous by-products are formed through the reduction of nitric oxide or nitrogen peroxide by ethylene glycol when the amount of the reducing agent, i.e., ethylene glycol is in a theoretical excess over nitric acid. Therefore, it is not preferable to add nitric acid in a dropwise manner to ethylene glycol, or to add ethylene glycol to a dilute solution of nitric acid. It is necessary to choose reaction condition so that ethylene glycol is always not in theoretical excess over nitric acid.

Ethylene glycol or its aqueous solution may be added in dropwise manner to the acid mixture solution so that the components in the reaction mixture will fall in the above mentioned concentration range. Also the acid mixture and ethylene glycol may be fed simultaneously to the reaction vessel.

The reaction may be carried out under any pressure. Nitric oxide and nitrogen peroxide which are formed during the reaction, may be oxidized with oxygen or oxygen containing gas and absorbed by the mother liquor which is recovered from the filtration stage to produce nitric acid which may be recycled. The reaction may be carried out either batch-wise or continuously.

The following examples illustrate the embodiment of this invention.

COMPARATIVE EXAMPLE 1

The concentration range of the acids employed in this example is not within the scope of the present invention.

In a 500 cc four necked reaction vessel provided with a stirrer, dropping funnel, thermometer and a reflux condensor to which a bubbling bottle and a gas holder were connected, 45 g of 97 wt percent sulfuric acid, 150 g of 63 wt percent nitric acid and 80 g of water were charged. The air within the whole reaction system was then replaced with helium. The acid mixture was heated to 80° C. and maintained at this temperature. A solution of 18.6 g of ethylene glycol in 25.6 g of water was added in a dropwise manner to the mixture over a period of 1 hour. After the addition, the reaction was continued for another 4 hours at the same temperature. The yield of the oxalic acid thus produced was only 47 percent.

COMPARATIVE EXAMPLE 2

This example indicates a reaction under deficiency of nitric acid. In a similar reaction vessel described in Comparative Example 1, 127 g of 96 wt percent sulfuric acid, 80 g of water and 15.5 g of ethylene glycol were charged. The air within the whole reaction system was then replaced with helium. The acid mixture was heated to 80° C. and maintained at this temperature.

A solution of 41 g of 98 wt percent nitric acid in 55 g of water was carefully added in a dropwise manner to the acid mixture over a period of 4 hours. A vigorous reaction occurred. After the addition, the reaction was continued for another 2 hours at the same temperature. The yield of oxalic acid thus produced was 58 percent. 19 percent of the total amount of the nitric acid employed was converted to nitrogen monoxide, and 5 percent to nitrogen.

COMPARATIVE EXAMPLE 3

This example indicates also a reaction under deficiency of nitric acid. In a reaction vessel provided with a stirrer, thermometer and a reflux condensor to which a bubbling bottle and a gas holder were connected, with an inlet at the bottom and an overflow, 480 g of 40 wt percent sulfuric acid was charged. The acid was heated to 80° C. and maintained at this temperature. From the inlet, an aqueous solution of an acid mixture consisted of 40.6 wt percent sulfuric acid and 26.1 wt percent nitric acid, and an aqueous solution of 43.4 wt percent ethylene glycol were added at a rate of 80 g/hour and 16.5 g/hour respectively. After 8 hours, an equilibrium was attained. At this point the yield of oxalic acid was 67 percent and the amount of nitrogen compounds which were not any more convertible to nitric acid such as nitrogen monoxide or nitrogen gas was 22 percent based on the total nitrogen in the nitric acid employed.

EXAMPLE 1

In a 500 cc four necked reaction vessel provided with a stirrer, a dropping funnel, thermometer and a reflux condensor to which bubbling bottle and a gas holder were connected, 153 g of 97 wt percent sulfuric acid, 147 g of 63 wt percent nitric acid and 80 g of water were charged. The air in the whole reaction system was then replaced with helium. The acid mixture was heated to 80° C. and maintained at this temperature. A solution of 18.6 g of ethylene glycol in 24.5 g of water was added in a dropwise manner to the mixture over a period of 1 hour. During the reaction, the mixture was maintained at the same temperature. After 2 hours from the completion of the ethylene glycol addition, the yield of oxalic acid reached 84 percent, and after 5 hours 94 percent. Neither nitrogen gas nor nitrogen monoxide which is not recoverable formed.

EXAMPLE 2

In a 500 cc reaction vessel provided with a stirrer, thermometer and a reflux condensor to which a bubbling bottle and a gas holder were connected, with an inlet at the bottom and an overflow, a solution of an acid mixture consisted of 35 wt percent sulfuric acid and 38 wt percent nitric acid and an aqueous solution of 49 wt percent ethylene glycol were added at a rate of 137 g/hr and 21.4 g/hr respectively, at a temperature of 80° C. The retention time of the reaction mixture in the reactor was 3.1 hours. After 24 hours of a continuous operation, a stationary state was reached, and the yield of oxalic acid measured then was 80.0 percent. Neither nitrogen gas nor nitrogen monoxide which is not recoverable formed.

When the reaction was carried out with two reaction vessels connected in a cascade, which were the same as used in the above experiment, the yield of oxalic acid at a stationary state was 92 percent. Neither nitrogen gas nor nitrogen monoxide which is not recoverable formed.

What is claimed is:

1. A process for producing oxalic acid which is substantially free of gaseous by-products which consists essentially of oxidizing ethylene glycol in the absence of any heavy metal catalysts with an acid mixture consisting of 2–60 wt percent nitric acid, 20–78 wt percent sulfuric acid and 20–50 wt percent water, whereby the molar ratio of nitric acid/ethylene glycol is at least 3/1.

2. A process according to claim 1, in which the reaction is carried out at a temperature of the range from 60° to 100° C.

* * * * *